United States Patent
Cho et al.

(10) Patent No.: US 7,799,482 B2
(45) Date of Patent: Sep. 21, 2010

(54) STACK OF GENERATORS AND FUEL CELL SYSTEM HAVING THE SAME

(75) Inventors: Sung-Yong Cho, Suwon-si (KR);
Ho-Jin Kweon, Suwon-si (KR);
Hyoung-Juhn Kim, Suwon-si (KR);
Ju-Yong Kim, Suwon-si (KR);
Yeong-Chan Eun, Suwon-si (KR);
Seong-Jin An, Suwon-si (KR);
Dong-Hun Lee, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1274 days.

(21) Appl. No.: 11/041,932

(22) Filed: Jan. 26, 2005

(65) Prior Publication Data
US 2005/0164064 A1 Jul. 28, 2005

(30) Foreign Application Priority Data
Jan. 26, 2004 (KR) .................. 10-2004-0004670

(51) Int. Cl.
*H01M 8/02* (2006.01)
*H01M 8/24* (2006.01)
*A47B 7/02* (2006.01)

(52) U.S. Cl. .................. 429/469; 429/470; 108/91
(58) Field of Classification Search .................. 429/32, 429/35, 38; 108/55.1, 55.3, 91
See application file for complete search history.

(56) References Cited

U.S. PATENT DOCUMENTS

| | | | | |
|---|---|---|---|---|
| 5,651,463 | A * | 7/1997 | Major et al. | 108/55.1 X |
| 6,409,138 | B1 * | 6/2002 | Baccini | 108/53.1 X |
| 6,613,467 | B1 * | 9/2003 | Chizawa et al. | 429/26 |
| 6,645,655 | B1 * | 11/2003 | McNamee et al. | 429/30 |
| 6,893,767 | B2 * | 5/2005 | Hatano et al. | 429/35 X |
| 6,941,877 | B2 * | 9/2005 | Dickner | 108/53.1 X |
| 7,220,512 | B2 * | 5/2007 | Ohara et al. | 429/38 |
| 2002/0055027 | A1 * | 5/2002 | Inoue et al. | 429/35 X |
| 2006/0141318 | A1 * | 6/2006 | MacKinnon et al. | 429/35 X |

FOREIGN PATENT DOCUMENTS

| | | |
|---|---|---|
| JP | 2002280016 | 9/2002 |
| JP | 2002284505 | 10/2002 |
| JP | 2002305006 | 10/2002 |
| JP | 2003331873 | 11/2003 |
| WO | 02061869 | 8/2002 |
| WO | 03086749 | 10/2003 |

* cited by examiner

*Primary Examiner*—Stephen J. Kalafut
(74) *Attorney, Agent, or Firm*—H.C. Park & Associates, PLC

(57) ABSTRACT

The present invention is a stacked fuel cell system which is formed by stacking a plurality of electricity generators, each electricity generator having a membrane-electrode assembly and a separator provided with the membrane-electrode assembly. The stack comprises an aligner which is disposed at least one portion of the separator and which couples and aligns the plurality of electricity generators.

19 Claims, 6 Drawing Sheets

STACK OF GENERATORS AND FUEL CELL SYSTEM HAVING THE SAME

CROSS REFERENCE TO RELATED APPLICATION

This application claims priority to and the benefit of Korean Patent Application No. 10-2004-0004670, filed on Jan. 26, 2004, which is hereby incorporated by reference for all purposes as if fully set forth herein.

BACKGROUND OF THE INVENTION

1. Field of the Invention

The present invention relates to a stack having a structure capable of easily aligning a plurality of electricity generators comprising a membrane-electrode assembly (MEA) and separators, and a fuel cell system having the same.

2. Description of the Related Art

In general, a fuel cell is an electricity generating system that directly converts chemical energy into electrical energy. It achieves this through a chemical reaction between oxygen or air containing the oxygen and hydrogen contained in hydrocarbon-grouped materials such as methanol, ethanol, natural gas, etc.

Fuel cells are classified into categories including phosphate fuel cells working at a temperature of about 150° C. to 200° C., molten carbonate fuel cells working at a high temperature of about 600° C. to 700° C., solid oxide fuel cells working at a high temperature of 1,000° C. or more, and polymer electrolyte membrane fuel cells and alkali fuel cells working at a room temperature or a temperature of 100° C. or less, depending upon the type of electrolyte. Such fuel cells work on the same principle, but differ from one another in type of fuel, operating temperature, catalyst, and electrolyte used in the cell.

The recently developed polymer electrolyte membrane fuel cell (PEMFC) has an excellent output characteristic, a low operating temperature, fast starting and response characteristics compared with other fuel cells, and uses hydrogen obtained by reforming methanol, ethanol, natural gas, etc. as fuel. Accordingly, the PEMFC has a wide range of applications such as a mobile power source for vehicles, a distributed power source for the home or buildings, and a small-sized power source for electronic apparatuses.

The PEMFC requires a fuel cell main body called a stack, a fuel tank, a fuel pump supplying fuel to the stack from the fuel tank, etc. for constituting a system. Such a fuel cell further comprises a reformer, which converts the fuel to generate hydrogen gas and supplies the hydrogen gas to the stack while supplying the fuel stored in the fuel tank to the stack. The fuel stored in the fuel tank is supplied to the reformer by means of the fuel pump which then, the reformer converts the fuel and generates hydrogen gas. Next, the stack makes the hydrogen gas and oxygen electrochemically react with each other, thereby generating electric energy.

Alternatively, a fuel cell can employ a direct methanol fuel cell (DMFC) scheme which directly supplies liquid-state fuel containing hydrogen to the stack to generate electricity. The fuel cell employing the DMFC scheme does not require the reformer, unlike the PEMFC.

In the fuel cell system described above, the stack has a stacked tower structure of several or several tens electricity generators having a membrane-electrode assembly (MEA) and separators (or bipolar plates). The membrane-electrode assembly is configured such that an anode electrode (also referred to as a "fuel electrode" or "oxidation electrode") and a cathode electrode (also referred to as an "air electrode" or "reduction electrode") are attached to each other with an electrolyte membrane therebetween. The separator simultaneously functions as a passageway through which oxygen and hydrogen gas required for the reaction of the fuel cell are supplied and as a conductor connecting the anode electrode and the cathode electrode of each membrane-electrode assembly to each other in series. Thus, hydrogen gas is supplied to the anode electrode and oxygen is supplied to the cathode electrode through the separator. This results in an electrochemical oxidation reaction of the hydrogen gas at the anode electrode and an electrochemical reduction reaction of oxygen at the cathode electrode. Due to flow of electrons mobilized by the reactions, electricity, heat, and water are generated.

One structural defect of the conventional stack is that it is very difficult to stack a plurality of electricity generators which have the membrane-electrode assembly and separators. Specifically, accurately aligning electrode portions of the membrane-electrode assemblies and gas flow channels of the separators has a large effect on the performance of the whole stack. In addition, completely sealing the gaps between the membrane-electrode assemblies and separators to prevent fuel gas from being leaked through the gaps becomes more and more important.

SUMMARY OF THE INVENTION

It is an object of the present invention to solve the aforementioned problems, by providing a stack having a structure capable of easily aligning a plurality of electricity generators comprising a membrane-electrode assembly (MEA) and separators to enhance performance of the stack and improving the seal between the membrane-electrode assembly and the separators. This invention also provides a fuel cell system having the stack.

According to an aspect of the present invention, a stack of a fuel cell system is provided which is formed by stacking a plurality of electricity generators. Each electricity generator in the stack has a membrane-electrode assembly and a separator provided with the membrane electrode assembly. The stack comprises an aligner that is disposed on at least one portion of the separator and couples and aligns the plurality, of electricity generators. The aligner may comprise a convex portion formed on one surface of the separator and a concave portion formed on the other surface of the separator correspondingly to the convex portion.

The aligner may be formed along the edges of the separator in either a continuous or discontinuous manner. It may also be disposed at the corners of the separator. The convex portion of the aligner may be formed integrally with the separator, and a flexible cover layer may be formed on the surface of the convex portion. The convex portion may also be formed separately from the separator or may be attached to it. In this case, the convex portion may be made of a flexible material.

Alternatively, the aligner may comprise a convex portion and a concave portion formed on one surface of the separator and a concave portion and a convex portion formed on the other surface of the separator corresponding to the convex portion and the concave portion. The aligner may include spacers which are inserted into and coupled with concave portions formed on one surface of the separator and the other surface opposing the one surface.

According to another aspect of the present invention, a fuel cell system comprising a stack that generates electricity through an electrochemical reaction between hydrogen and oxygen, a reformer that reforms fuel to generate hydrogen gas, a fuel supply unit that supplies the fuel to the reformer, and an air supply unit supplying air to the stack has been developed. In this case, the stack is formed by stacking a plurality of electricity generators where each generator has a membrane-electrode assembly and a separator provided with the membrane-electrode assembly. The stack also includes an aligner that is disposed on at least one portion of the separator and couples and aligns the plurality of electricity generators.

The fuel cell system may further comprise a reformer which is disposed between the fuel supply unit and the stack and reforms the fuel supplied from the fuel supply unit to generate gas containing hydrogen and to supply the generated gas to the stack. The fuel cell system may employ a polymer electrolyte membrane fuel cell (PEMFC) scheme.

The fuel cell system may employ a direct methanol fuel cell (DMFC) scheme.

BRIEF DESCRIPTION OF THE DRAWINGS

The above and additional features and advantages of the present invention will become more apparent by describing detailed exemplary embodiments thereof with reference to the attached drawings.

DETAILED DESCRIPTION OF THE EMBODIMENTS

Hereinafter, embodiments of the present invention will be described in detail with reference to the accompanying drawings such that the embodiments can easily be put into practice by those skilled in the art. However, since the present invention can be embodied in various forms, the present invention is not limited to the embodiments described below.

Figure 1:
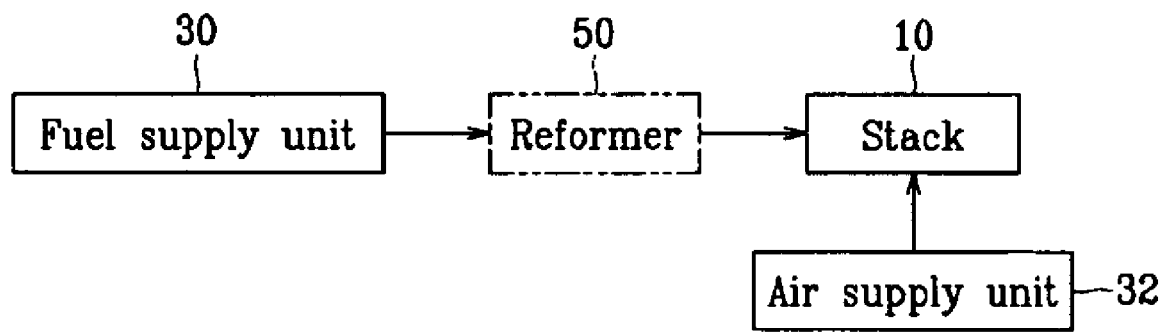
FIG. 1 is a block diagram schematically illustrating a fuel cell system according to the present invention.
Figure 2:
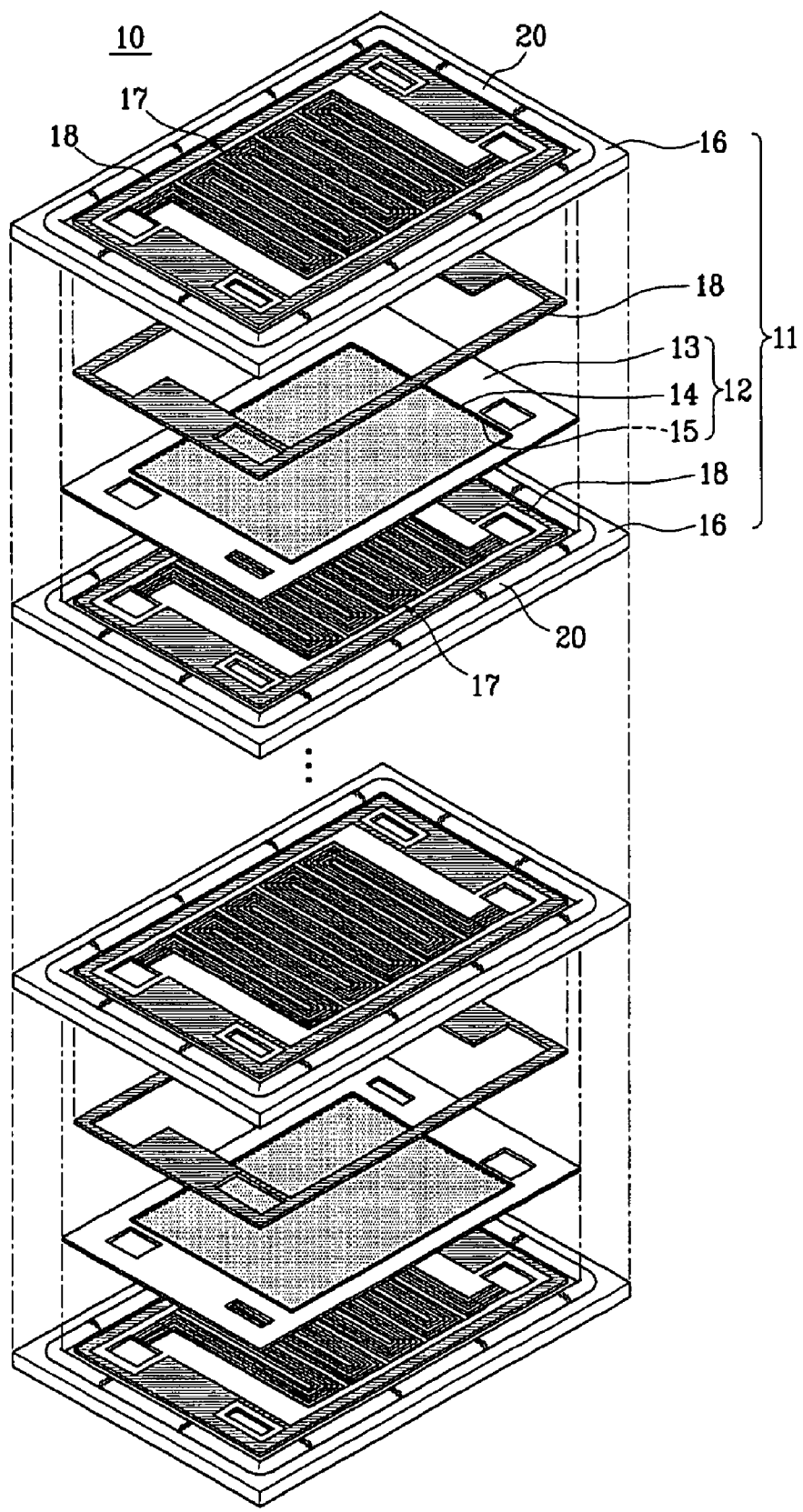
FIG. 2 is an exploded perspective view illustrating a structure of a stack of the fuel cell system according to an embodiment of the present invention.

FIG. 1 is a block diagram schematically illustrating a fuel cell system according to the present invention and FIG. 2 is an exploded perspective view illustrating a structure of a stack of the fuel cell system according to an embodiment of the present invention.

Referring to the figures, a fuel cell system according to the present invention employs a polymer electrolyte membrane fuel cell (PEMFC) in which fuel-containing hydrogen is converted to generate hydrogen gas by a reformer. The chemical energy generated by allowing the hydrogen gas and oxygen to electrochemically react with each other is directly converted into electric energy. Here, the fuel includes hydrocarbon-grouped fuel such as methanol, ethanol, natural gas, etc. Pure oxygen gas stored in an additional storage means or external air-containing oxygen may be used. An example where the external air is used as the oxygen source will be explained in the following description.

The fuel cell system 100 according to the present invention comprises a stack 10 which is supplied with fuel and air to generate electric power, a fuel supply unit 30 storing the fuel and supplying the fuel to the stack 10, a reformer 50 which is disposed between the stack 10 and the fuel supply unit and which reforms the fuel supplied from the fuel supply unit 30 to generate hydrogen gas, and an air supply unit 32 supplying the external air to the stack 10.

The fuel cell system 100 according to the present invention may further comprise a DC-AC transformer and a controller for converting DC electricity generated from the stack 10 into AC electricity, and a heat sink discharging heat generated during generating electricity.

The present invention may be embodied as a direct methanol fuel cell (DMFC) system in which liquid methanol fuel can be directly supplied to the stack 10. The DMFC does not require the reformer 50, unlike the PEMFC.

Hereinafter, the present invention will be described as the PEMFC system.

The reformer 50 has a conventional reformer structure as used in a conventional PEMFC, and thus detailed description thereof will be omitted in the following description. The fuel supply unit 30 comprises a fuel tank (not shown) which stores fuel containing hydrogen and a fuel pump (not shown) which supplies the fuel stored in the fuel tank to the reformer 50.

The stack 10 comprises a plurality of electricity generators 11 that are supplied with the hydrogen gas reformed by the reformer 50 and the air and that cause oxidation and reduction reactions to finally generate electric energy, and an aligner 20 for accurately aligning the adjacent electricity generators 11 when stacking the plurality of electricity generators 11.

Each electricity generator 11 constitutes a unit cell that generates electricity. It includes a membrane-electrode assembly (MEA) 12 that oxidizes hydrogen gas reduces air as well as separators 16 that supply the hydrogen gas and the air to the membrane-electrode assembly 12.

The membrane-electrode assembly 12 is configured so that an electrolyte membrane 13 is interposed between an anode electrode 15 and a cathode electrode 14. The anode electrode 15 includes a catalytic layer for converting the hydrogen gas into electrons and hydrogen ions and a support layer for smoothly moving the electrons and the hydrogen ions. The cathode electrode 14 includes a catalytic layer for converting oxygen from the air into electrons and oxygen ions and a support layer for smoothly moving the electrons and the oxygen ions. The electrolyte membrane 13 is a solid-state polymer electrolyte having a thickness of 50 to 200 μm, and acts as a medium for ion exchange when transferring the hydrogen ions generated in the catalytic layer of the anode electrode 15 to the catalytic layer of the cathode electrode 14.

The separator 16 simultaneously functions as a conductor connecting the anode electrode 15 of a first membrane-electrode assembly 12 and the cathode electrode 14 of a second membrane-electrode assembly 12 in series as well as a passageway for substantially supplying the hydrogen gas and air required for the oxidation and reduction reactions of the membrane-electrode assembly 12. Accordingly, a flow channel 17, which is the passageway for supplying the hydrogen gas and air required for the oxidation and reduction reactions of the membrane-electrode assembly 12, is formed on the surface of the separator 16. The separator 16 may be made of carbon graphite, carbon composite, or metal.

In addition, a gasket 18 for preventing the reaction gases (hydrogen and air), which are supplied through the flow channel 17 of the respective separators 16, from being leaked externally is disposed between the adjacent separators 16 sandwiching the membrane-electrode assembly 12.

The stack 10 having the structure described above generates electricity, heat, and water in accordance with the following chemical reactions.

Anode reaction: $H_2 \rightarrow 2H^+ + 2e^-$

Cathode reaction: $\frac{1}{2}O_2 + 2H^+ + 2e^- + H_2O$

Total reaction: $H_2 + \frac{1}{2}O_2 \rightarrow H_2O + current + heat$

Referring to the chemical reactions, the hydrogen gas is supplied to the anode electrode 15 of the membrane-electrode assembly 12 through the separators 16, and the air is supplied to the cathode electrode 14. When the hydrogen gas flows to the anode electrode 15, hydrogen is decomposed into electrons and protons (hydrogen ions) in the catalytic layer. When the protons pass through the electrolyte membrane 13, electrons, oxygen ions, and protons are combined to generate water with the help of the catalyst in the cathode electrode 14. The electrons generated from the anode electrode 15 do not pass through the electrolyte membrane 13 but are moved to the cathode electrode 14 through an external circuit. Through these processes, electricity, water, and heat are generated.

The aligner 20 aligns the electricity generators 11 so as to accurately match the portion where the electrodes 14 and 15 of the membrane-electrode assembly 12 with the portion where the flow channel 17 is formed in the separators 16 when the plurality of electricity generators 11 are stacked.

When the portion where the electrodes 14 and 15 are formed and the portion where the flow channel 17 is formed are not accurately aligned, the flow and pressure of the reaction gas supplied through the flow channel 17 become unstable and the distribution of current and temperature become uneven, thereby causing local electrical and thermal overloads. This may result in a deterioration of the efficiency of the fuel cell system and a shortening of its lifetime. The aligner 20 is formed on at least one portion of the separator in a configuration such as a straight line, but is not limited to the straight line. The aligner 20 may have various shapes including curved line, etc.

Figure 3:
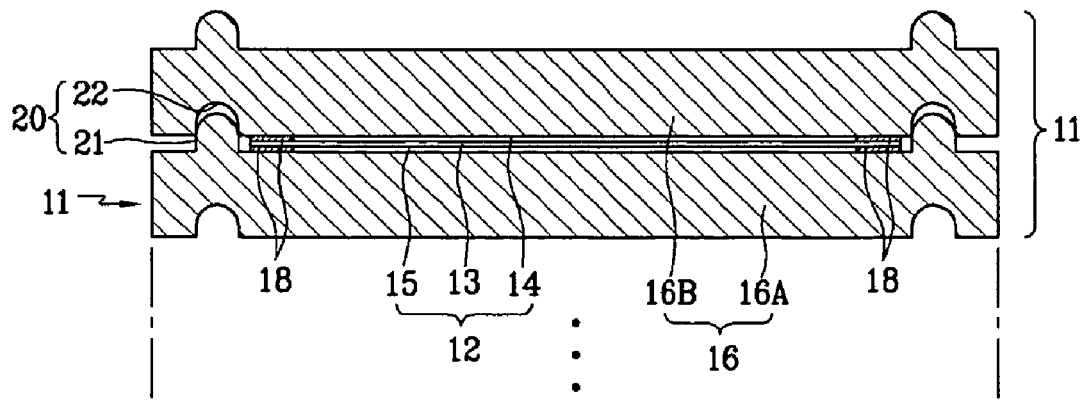
FIG. 3 is a partial cross-sectional view illustrating an aligner according to an embodiment of the present invention.

Hereinafter, the aligners 20 will be described in detail. FIG. 3 is a cross-sectional view illustrating how the electricity generators 11 are aligned with the aligners 20. In FIG. 3, two electricity generators 11 are aligned and coupled in the stack 10. In the following description, for the purpose of convenience, the separator positioned at the lower side in FIG. 3 is referred to as a first separator 16A and the separator positioned at the upper side in FIG. 3 is referred to as a second separator 16B.

The aligner 20 comprises a convex portion 21 and concave portion 22 formed at the corresponding positions of the adjacent separators 16 such that the adjacent separators 16 can be stacked while accomplishing a complementary shape coupling.

The convex portion 21 may be continuously protruded along the edge portion of the upper surface of the first separator 16A. The first separator 16A has an inner portion that overlaps with the membrane-electrode assembly 12 and an outer portion that surrounds the aligner 21, and an upper surface of the inner portion is coplanar with an upper surface of the outer portion. The convex portion 21 can be formed by machining the edge portion of the first separator 16A in a convex shape. The substantial section thereof may have a semi-elliptical shape as shown in the figures, and may have various shapes including triangular, square, etc.

Figure 4:
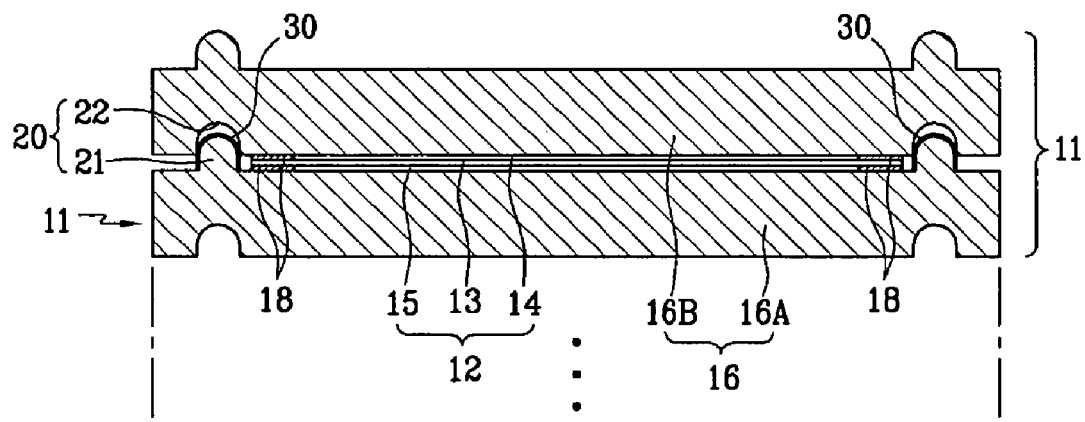
FIGS. 4, 5, 6A, 6B, 7A, 7B, and 8 are partial cross-sectional views illustrating the aligners according to modifications of the present invention.

A cover layer 30 made of flexible polymer is further formed on the surface of the convex portion 21 (see FIG. 4). The cover layer 30 is provided to maximize the sealing effect between the coupled surfaces when the electricity generators 11 are coupled to each other. The convex portion 21 serves as a guide for accurately matching the membrane-electrode assembly 12 with the portion of the separator 16 where the flow channel 17 is formed when the membrane-electrode assembly 12 is attached to the separator 16.

The concave portion 22 is formed as a groove along the edge portion of the lower surface of the second separator 16B opposing the convex portion 21. The convex portion 21 can be substantially coupled to the concave portion 22.

In order to couple together the total separators 20 constituting the stack 10, the concave portion 22 is formed at the edge portion of the lower surface of the first separator 16A and the convex portion 21 is formed at the edge portion of the upper surface of the second separator 16B.

According to this structure, when the membrane-electrode assembly 12 comes in close contact with the surface of the separator 16 on which the flow channel 17 is formed in the respective electricity generators 11, the membrane-electrode assembly 12 is guided by the convex portion 21 and is easily positioned at the inside of the convex portion 21. This is the area where the flow channel 17 is formed so that the membrane-electrode assembly 12 can be accurately attached to the surface on which the flow channel 17 is formed.

When the electricity generators 11 are stacked to form the stack 10, it is possible to align several or several tens of unit cells 11 simply in a line for example, by coupling the convex portion 21 of the first separator 16A and the concave portion 22 of the second separator 16B to each other.

Aligners according to modifications of the present invention will be now described.

Figure 5:
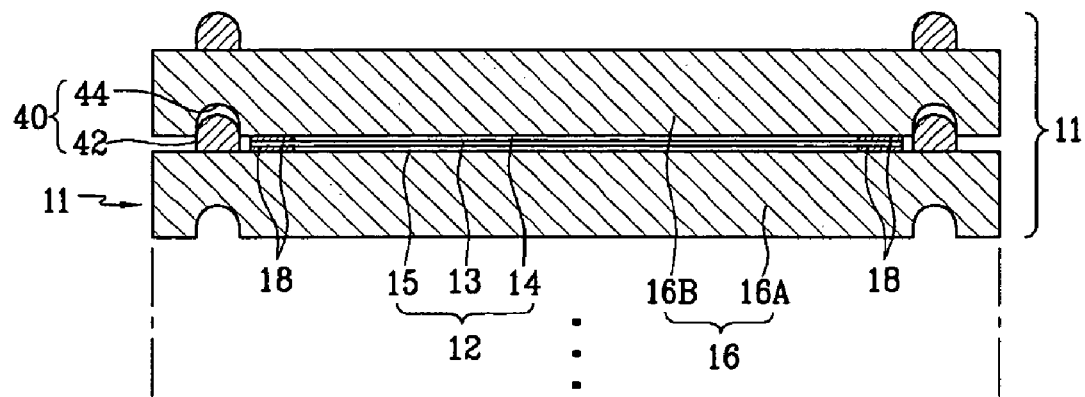

An aligner 40 shown in FIG. 5 also comprises a convex portion 42 and a concave portion 44, as described above. The convex portion 42 is not formed integrally with the separator 16, but is separately formed and attached to the edge portion of the separator 16. The convex portion 42 may be made of flexible polymer so as to enhance the sealing effect.

Figure 6A:
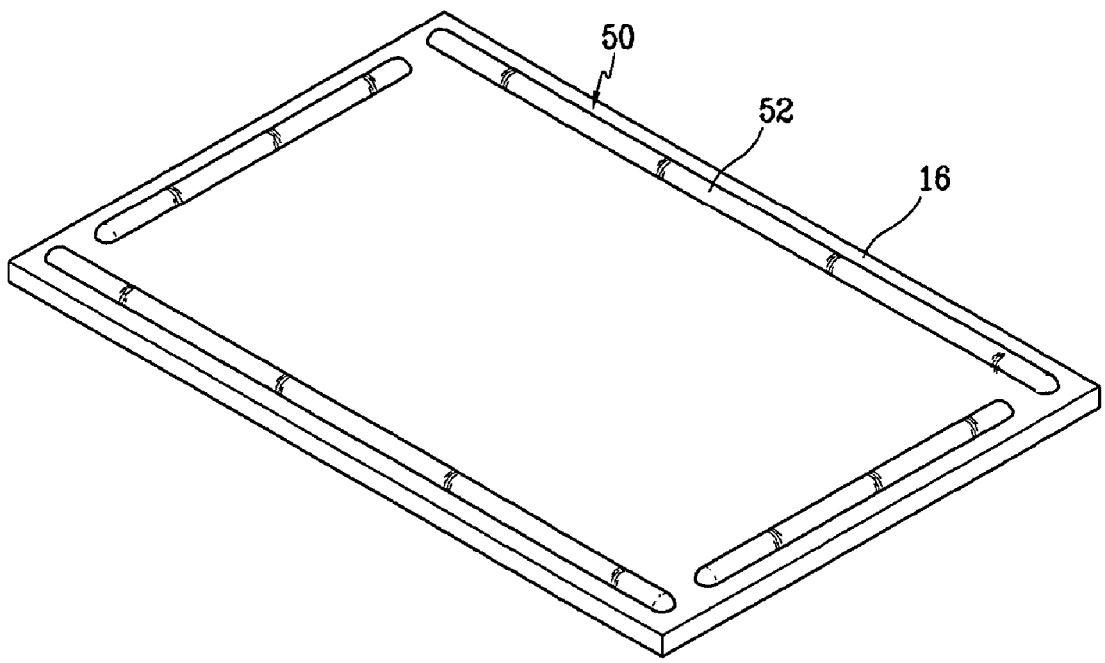
Figure 6B:
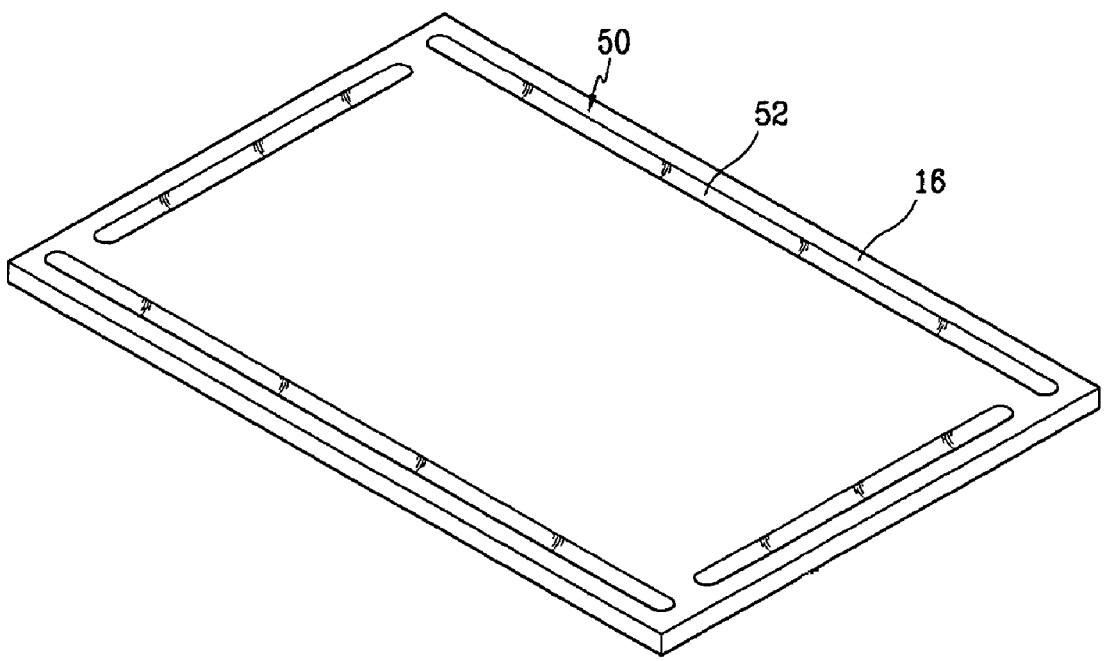

In an aligner 50 shown in FIGS. 6A and 6B, a convex portion 52 formed on the upper surface of the separator 16 and a concave portion 54 formed on the lower surface of the separator 16 are not continuously formed along the edge portion of the separator 16, but are discontinuously formed along the edges of the separator 16.

Figure 7A:
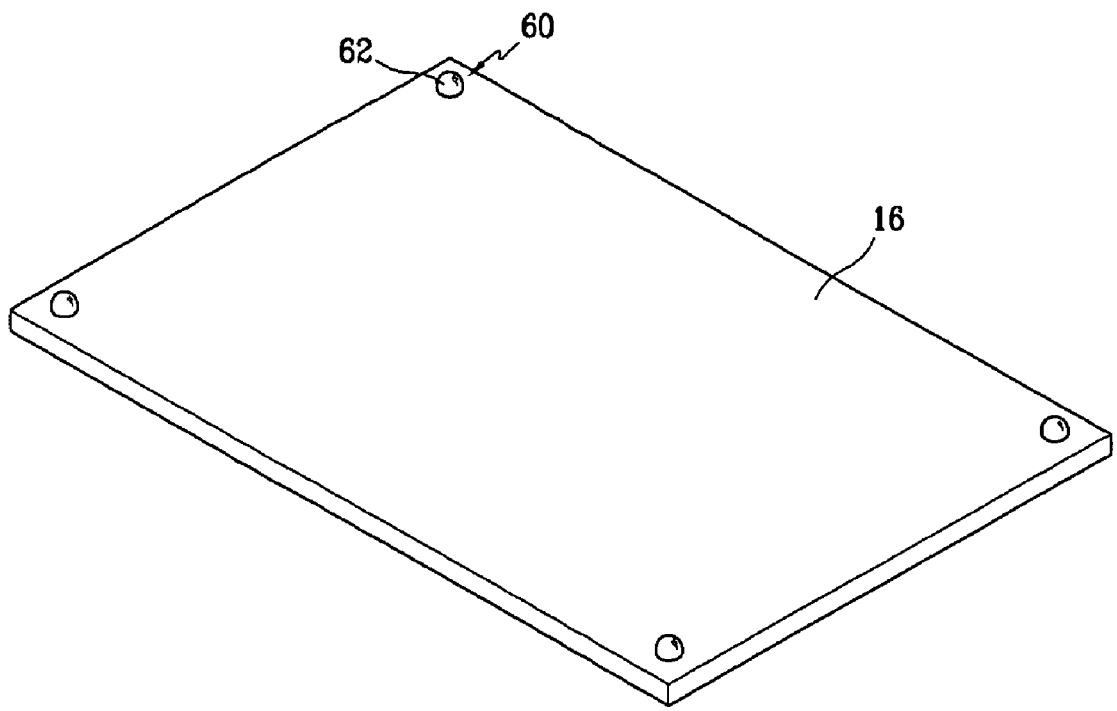
Figure 7B:
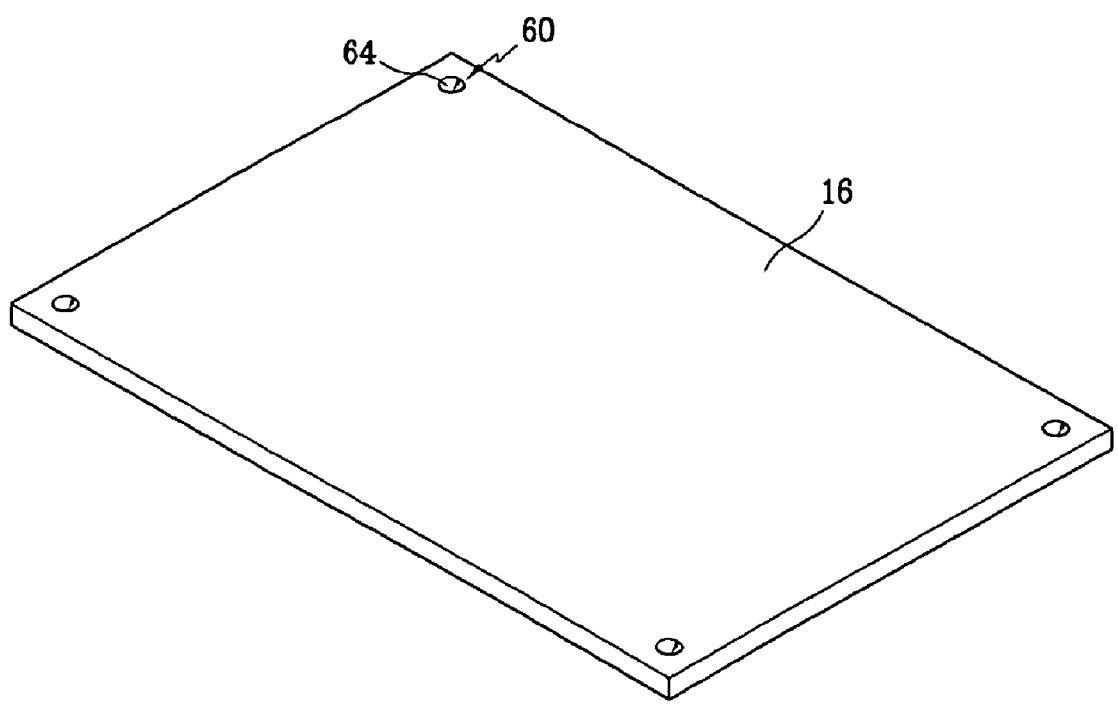

In an aligner shown in FIGS. 7A and 7B, a convex portion 62 formed on the upper surface of the separator 16 and a concave portion 64 formed on the lower surface of the separator 16 are positioned at the corners of the separator 16. That is, the convex portion 62 and the concave portion 64 corresponding to the convex portion 62 are locally positioned on the separator 16, and the formation positions are not limited to the corners but may be anywhere along the edges of the separator 16. Moreover, the plural convex portions 62 and the plural concave portions 64 may be formed periodically or non-periodically at a predetermined interval. The flow channel 17 formed on the separator 16 is not shown in FIGS. 7A and 7B.

Figure 8:
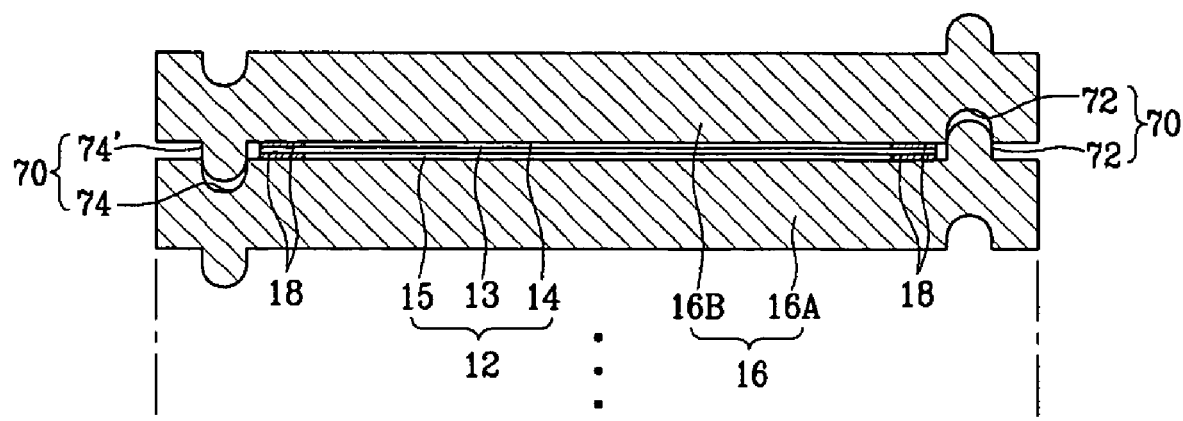

In an aligner 70 shown in FIG. 8, a convex portion 72 and a concave portion 74 are formed at the edges of the lower surface of the separator 16, and a concave portion 72' and a convex portion 74' corresponding to the convex portion 72 and the concave portion 74, respectively, are formed at the edges of the upper surface of the separator 16.

Figure 9:
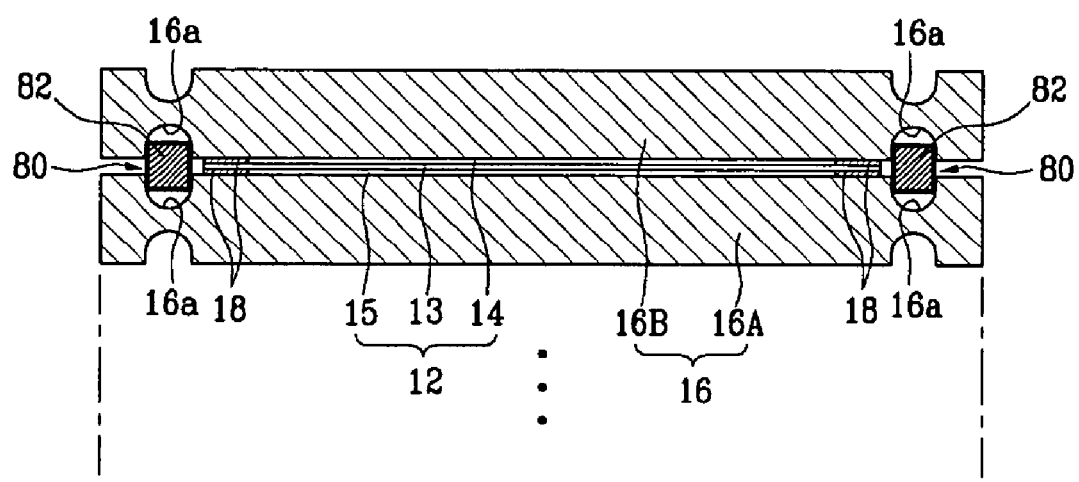
FIG. 9 is a partial cross-sectional view illustrating the aligner according to another embodiment of the present invention.

FIG. 9 is a partial cross-sectional view illustrating the stack using an aligner according to another embodiment of the present invention. As shown in FIG. 9, the aligner 80 according to the present embodiment includes spacers 82 inserted into and coupled with concave portions 16a formed in the adjacent separators 16. That is, the spacers 82 are inserted into the concave portions 16a positioned opposite each other to align the electricity generators 11, when a plurality of electricity generators 11 is stacked. Here, the spacers 82 may form a rectangular section, but are not limited to the rectangular section.

The spacers 82 prevent the reaction gases from leaking between the electricity generators 11, and buffer the external forces acting on the respective separators 16 when the electricity generators 11 are stacked.

As described above, according to the present invention, since the electricity generators can be easily aligned, it is possible to further enhance the performance of the entire stack by accurately aligning the portions where the electrodes of the membrane-electrode assembly are formed and the portions where the gas flow channel is formed in the separators. In addition, it is possible to prevent the leakage of fuel gas through the gaps between the electricity generators.

Although the exemplary embodiments of the present invention have been described, the present invention is not limited to the above exemplary embodiments, but may be modified in various forms without departing from the scope of the appended claims, the detailed description, and the accompanying drawings of the present invention. Therefore, it is natural that such modifications belong to the scope of the present invention.

What is claimed is:

1. A stack, comprising:
   a plurality of electricity generators;
   wherein each electricity generator comprises a membrane-electrode assembly and a separator,
   wherein an aligner is disposed on at least one portion of each separator to couple and align the plurality of electricity generators,
   wherein the membrane-electrode assemblies do not overlap with the aligners, wherein an inner portion of each separator overlaps with the membrane-electrode assemblies,
   wherein an outer portion of each separator surrounds the aligner, and
   wherein an upper surface of the inner portion and an upper surface of the outer portion are coplanar.

2. The stack of claim 1, wherein the aligner comprises:
   a convex portion formed on a first surface of the separator; and
   a concave portion formed on a second surface of the separator corresponding to the convex portion, the second surface being opposite the first surface.

3. The stack of claim 2, wherein the aligner is formed along the edges of the separator.

4. The stack of claim 3, wherein the aligner is continuously formed.

5. The stack of claim 3, wherein the aligner is discontinuously formed.

6. The stack of claim 2, wherein the aligner is formed as a straight line.

7. The stack of claim 2, wherein the aligner is disposed at the corners of the separator.

8. The stack of claim 2, wherein the convex portion is formed integrally with the separator.

9. The stack of claim 8, wherein a flexible cover layer is formed on the surface of the convex portion.

10. The stack of claim 2, wherein the convex portion is formed separately from the separator and is attached to the separator.

11. The stack of claim 10, wherein the convex portion is made of a flexible material.

12. The stack of claim 1, wherein the aligner comprises:
    a convex portion and a concave portion formed on a first surface of the separator; and
    a concave portion on a second surface of the separator corresponding to the convex portion and a convex portion formed on the second surface of the separator corresponding to the concave portion.

13. The stack of claim 1, wherein the aligner comprises:
    two concave portions formed on a first surface of the separator; and
    two concave portions formed on a second surface of the separator corresponding to the concave portions formed on the first surface of the separator;
    wherein spacers are inserted into the cavities formed by the alignment of corresponding concave portions of adjacent separators.

14. The stack of claim 1, wherein a gasket is provided between the membrane-electrode assembly and the separators.

15. The stack of claim 1, wherein the separator is made of a material selected from a group consisting of carbon graphite, carbon composite, and metal.

16. A fuel cell system, comprising:
    a stack generating electricity through a chemical reaction;
    a fuel supply unit supplying a fuel to the stack; and
    an air supply unit supplying air to the stack,
    wherein the stack is formed by stacking a plurality of electricity generators, each electricity generator comprising a membrane-electrode assembly and a separator, and the stack comprising an aligner disposed on at least one portion of each separator,
    wherein the separators couple and align the plurality of electricity generators,
    wherein the membrane-electrode assemblies do not overlap with the aligners,
    wherein an inner portion of each separator overlaps with the membrane-electrode assemblies, and
    wherein an outer portion of each separator surrounds the aligner, and
    wherein an upper surface of the inner portion and an upper surface of the outer portion are coplanar.

17. The fuel cell system of claim 16, further comprising:
    a reformer that is disposed between the fuel supply unit and the stack and that converts the fuel supplied from the fuel supply unit to generate gas containing hydrogen and to supply the generated gas to the stack.

18. The fuel cell system of claim 17, wherein a polymer electrolyte membrane fuel cell (PEMFC) scheme is employed.

19. The fuel cell system of claim 16, wherein a direct methanol fuel cell (DMFC) scheme is employed.

* * * * *